Figure 1:
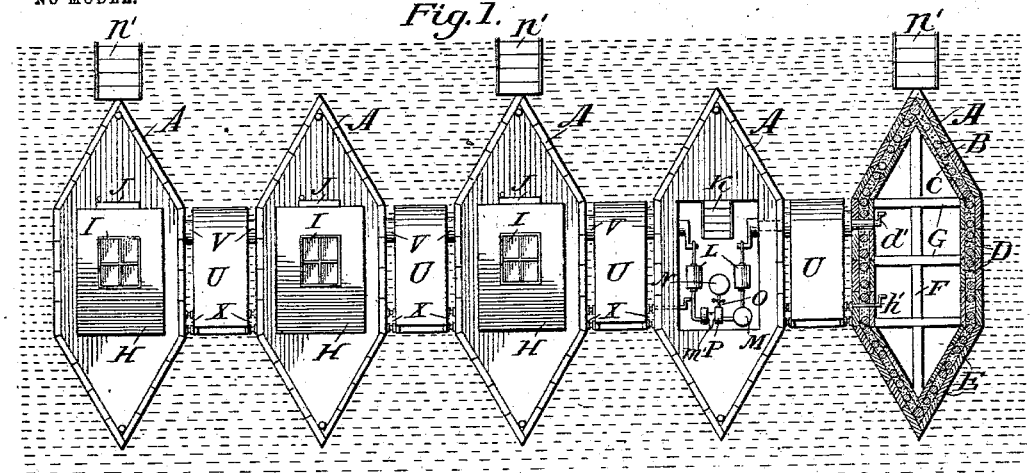

No. 730,560. PATENTED JUNE 9, 1903.
G. NOBLÉ-TODD.
WAVE MOTOR.
APPLICATION FILED FEB. 20, 1901.
NO MODEL. 2 SHEETS—SHEET 1.

Witnesses:
E. C. Todd
E. A. Barker

Inventor:
George Noblé-Todd

No. 730,560. PATENTED JUNE 9, 1903.
G. NOBLÉ-TODD.
WAVE MOTOR.
APPLICATION FILED FEB. 20, 1901.
NO MODEL. 2 SHEETS—SHEET 2.
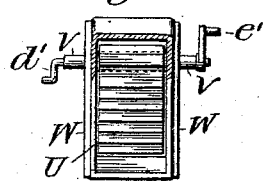
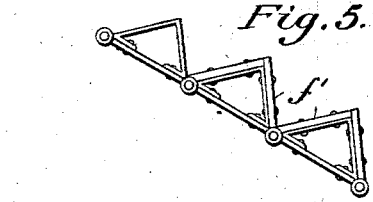
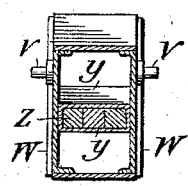
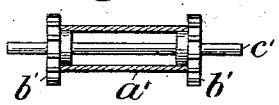
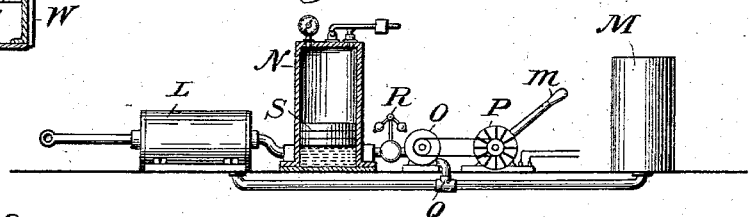
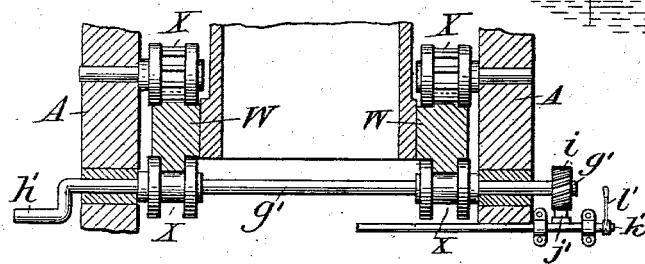
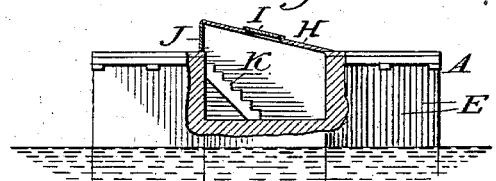
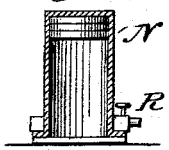
Witnesses:
L. C. Todd
E. A. Barker
Inventor:
George Noblé-Todd No. 730,560. Patented June 9, 1903.

UNITED STATES PATENT OFFICE.

GEORGE NOBLÉ-TODD, OF LOS ANGELES, CALIFORNIA.

WAVE-MOTOR.

SPECIFICATION forming part of Letters Patent No. 730,560, dated June 9, 1903.

Application filed February 20, 1901. Serial No. 48,161. (No model.)

*To all whom it may concern:*

Be it known that I, GEORGE NOBLÉ-TODD, a citizen of the United States of America, residing at Los Angeles, in the county of Los Angeles and State of California, have invented certain new and useful Improvements in Wave-Motors; and I do declare the following to be a full, clear, and exact description of the invention, such as will enable others skilled in the art to which it appertains to make and use the same, reference being had to the accompanying drawings, and to the letters marked thereon, which form a part of this specification.

This invention relates to a novel wave-motor arranged and adapted to obtain power from all the wave motions—viz., the inflow tide, the outflow tide or ebb, the rise of the waves, their fall, and the push, dash, or beating action of the waves.

The primal object of this invention is to form a dam or breakwater by means of supports or piers secured to the ocean bed or bottom, said supports or piers being arranged and adapted to converge the water, so as to cause it to concentrate and pass through narrow passage-ways or channels between said piers.

The second object is to place wave-motors in said passage-ways or channels between said supports or piers, said wave-motors being arranged and adapted as rotary wave-motors or combined rotary and lever wave-motors actuated by the water moving in said passage-ways or channels.

The third object is to arrange and adapt said wave-motors to be actuated by the inflow water falling upon and flowing over said wave-motors and by the outflow water flowing under and against said wave-motors, forming inclined treadmills or overshot and undershot wave-motors.

The fourth object is to form a lever frame culvert or chute-box and to arrange a rotary wave-motor upon said frame or within said culvert, chute, or box and to obtain power from the rise and fall of said frame or box and additional power from the rotation of said rotary wave-motor, thereby forming a combined lever wave-motor and a rotary wave-motor when actuated by the waves and tides.

The fifth object is to form said rotary wave-motor of troughs, propeller devices, or forming an endless rotatable chain arranged and adapted to form an inclined mechanical seashore upon which the inflow waves are forced to fall just as they would upon the natural shore, the ebb or return water washing under and against said chain, thereby rotating said chain.

The sixth object is to form said piers so as to be used as a solid, strong, indestructible, and economical support and foundation for any desired superstructure or building and at the same time within or upon said pier or superstructure form a power-house or storage-room and also adapt said pier to converge and concentrate both the inflow and outflow water and form a support for an endless-chain wave-motor.

The seventh object is to provide means for storing and equalizing the erratic inconstant wave action into a steady controllable power and to thereby generate electricity, and thus transmit the power to any desired place for general use.

These objects are obtained by the devices illustrated in the drawings, in which—

Figure 2:
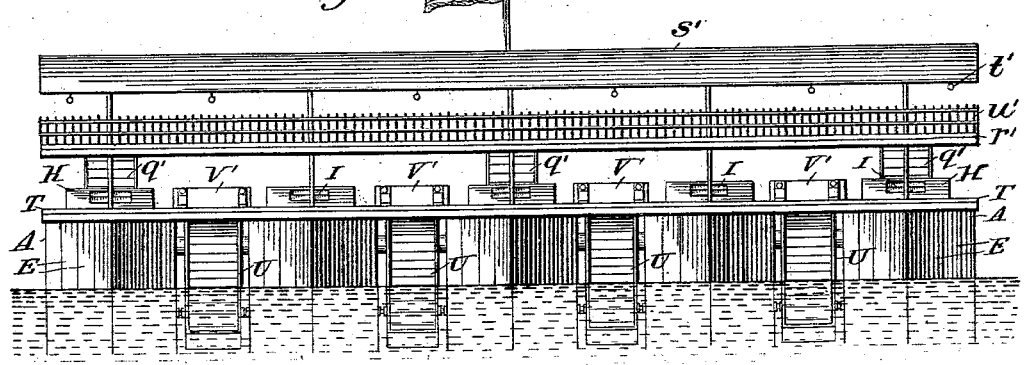
Figure 3:
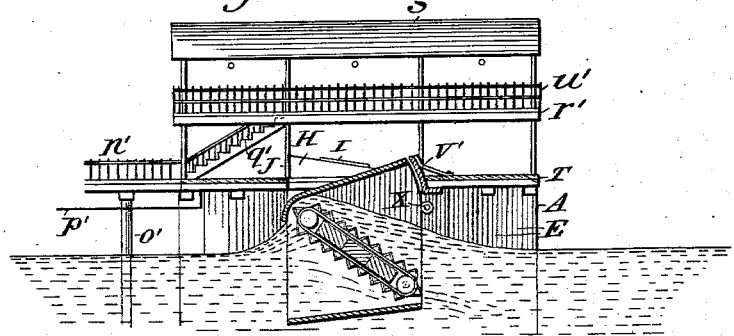

Figure 1 is a plan view of my invention with one end pier in sectional detail and the cover or roof removed from the next pier to better illustrate the pier construction and power machinery. Fig. 2 is a sea-view front elevation showing the piers supporting a pavilion superstructure. Fig. 3 is a side elevation with the end pier removed to show the rotary and lever wave-motor, which is illustrated in a central longitudinal section view. Fig. 4 is a rear view of the rotary and lever wave-motor, parts being in sectional detail. Figs. 5 and 6 are detail views of forms of the rotatable endless chain of troughs which form the rotary wave-motor. Fig. 7 is a rear view sectional detail of the lever culvert or chute-box as constructed of boiler-iron or other materials to form the lever wave-motor. Fig. 8 is a side view sectional detail of the mechanism to store and equalize the wave power and convert it into electricity. Fig. 9 is a sectional plan view of the roller-sprockets for the trough-chain. Fig. 10 is an exaggerated sectional plan detail of the guide-rails, roller-supports, and hoisting device for the lever culvert or chute-box. Fig. 11 is a sectional side view of one of the piers. Fig. 12 is a side view of a common hydraulic compressor which may be substituted for the hydraulic air-compressor shown in Fig. 8.

Similar letters of reference indicate the same parts in the drawings and the several figures thereof.

Referring by letter to the accompanying drawings, in Figs. 1, 2, 3, and 11, A indicates a pier formed of a series of piles B, which are driven down into the ocean bed or bottom to form a diamond-shaped pen. The piles B are secured top and bottom by timbers C with blocks D, outside of which are driven down into the ocean bed or bottom planks of flat timbers E, which are bolted to the timbers C and blocks D and form a smooth closed outside wall from the bottom of the ocean, projecting upward out of the ocean beyond high-tide water. This wall is further tied and braced together by longitudinal beams F and cross-timbers G. This pen is then filled with a rosin cement and rubble-stone mixed together, so as to set and harden in the water into one common hard stone, thereby expelling the water from the pen and filling it up solid with this composite stone material, all except an interior room, which is used as a power and storage house for the power machinery, as seen in the second pier on the right of Fig. 1 and further illustrated in Fig. 11. This power-house is provided with a sloping roof H, provided with skylights I and an entrance-door J, through which a descent is made into the room by means of steps K. In this room is located pumps L, arranged to pump water from a reservoir M into a hydraulic compressor N, which forces it through a governor R into a water-engine O, arranged to be thereby driven and in turn driving a dynamo P. The exhaust-water from the water-engine O is discharged by it into a pipe Q, returning to the reservoir M, and again drawn by the pumps L to again travel around the same endless circuit. The said mechanism is further and more clearly illustrated in Fig. 8, in which the hydraulic compressor consists of a cylinder provided with a piston-head S, held down by compressed air at the desired number of pounds pressure to the square inch above it, the piston-head resting upon the water under it pumped in by the pumps L. It will naturally follow that the higher up the piston-head S rises in the cylinder the greater will be the compressed-air pressure above it, and thus a great power can be stored in a small compass, which can be used, governed, and controlled by the governor R, which will graduate and regulate the flow of water under the tremendous compressed-air pressure from the compressor N out into the water-engine O just as it would steam-pressure, and thereby store up, govern, and control great power, and thereby steadily, smoothly, and continuously operate the dynamo P under a continuous even pressure and speed, thereby generating electricity, whereby power can be continuously and steadily transmitted to a desired distance for general purposes and use. It will be obvious that the same result can be achieved through the ordinary hydraulic weight-compressor, as in Fig. 12. A series of the said piers (each provided with similar storage or power rooms and similar power machinery) are arranged parallel to each other out in the ocean along the seashore, each pier being sloped or diamond-pointed on both its ends, so that the series of piers form a series of converging passage-ways or channels in the front and rear of the piers, which are covered by a platform or roof T, the said channels converging to and connecting with narrow parallel passage-ways between said piers, in which are arranged buoyant floating lever culverts or chute-boxes U, connected to the piers by means of sleeve arms or shafts V and bolted or otherwise provided with guide racks or rails W, arranged to be held by and move up and down between grooved rollers X, whereby the said boxes U are supported front and rear on both sides from each pier as said boxes rise and fall with the water upon which they rest buoyant. The construction of the said lever culvert or chute-box and its mechanism is further illustrated in Figs. 7 and 10. The said box-frame, Fig. 7, is preferably formed of buoyant wood pieces or of boiler-iron or sheet-steel riveted together to form the two sides, top, and bottom and also the inclined central partition-plates Y, reinforced by a buoyant material or wood timbers Z, the pivotal arms or sleeve-shafts V and the guide rails or racks W being bolted or riveted to the side pieces and the guide-rollers X, secured to the piers A, as further illustrated in Fig. 10. Two sheet-metal drums or rollers $a'$, Fig. 9, are provided with sprocket or chain wheels $b'$, which are made fast to central shafts $c'$ and journaled to rotate in the pendulum culvert or chute-box, as in Fig. 4. Chains are secured around said sprocket-wheels $b'$ and provided with rollers forming carriages, to which are secured boards to form an endless chain of troughs, as in Figs. 5 and 6. The central shaft $c'$ of the upper drum is made the drive-shaft and provided on one end with a crank $d'$, while the other central shaft $c'$ of the other chain-sprocket drum or roller is only used as a bolt-shaft to secure said drum to the lower end of said pendulum-box as an idler-roller for the endless chain of troughs, which thus are arranged to travel around upon the said two drums, rolling upon and under the central inclined plates Y. One of the said pivotal arms or sleeve-shafts V of the said pendulum-box is provided with a crank-arm $e'$, as illustrated in Fig. 4, and being pivoted pendent from and between the piers, as in Fig. 1, the said crank-arm $e'$ is connected to the pump L, and thereby actuates the machinery in one pier, while the crank-arm $d'$ of the drive-shaft of the endless trough-chain is connected to a similar pump L and actuates the machinery in the other pier, as illustrated in Fig. 1, the action of the waves imparting a swinging or pendulum lever motion to the box U and its crank-arm $e'$, thereby actuating its connecting-pump L, and thereby its connecting-compressor N, water-engine O, and dynamo P, while the endless trough-chain is also actuated by the waves and caused to rotate, and thereby rotate its crank-arm $d'$, and thereby drive its pump L in the opposite pier, and thereby actuate its connecting-compressor N, water-engine O, and dynamo P, as in Fig. 1, the said wave action being further illustrated in Fig. 3, in which it is seen that the endless trough-chain is caused to rotate by both the inflow and outflow water, while it is apparent that as the box is pendent from the top of the piers and floating upon the water in the channel between the piers it will be caused to move up and down in pendulum-lever fashion by the least disturbance of the water, the buoyancy of the box being produced by the wood timbers Z and the wood planks $f'$, forming the troughs of the endless chain.

In order to hoist the wave-motors up out of the water for repairs or other purposes, the front guide-rollers X are provided with teeth engaging teeth in the front edge of the guide rails or racks W, and the shafts of the said rollers X are made long enough to connect the said two rollers fast on each end of said shaft $g'$ and the ends of said shaft provided either with crank-handles $h'$ or worm-wheels $i'$, meshing with a worm-screw shaft or stud $j'$, provided with a gear meshing with a gear on a shaft $k'$, provided with a lever or hand-wheel $l'$, by means of either of which devices the said pendulum-box and wave-motor may be readily hoisted up out of the water or lowered down into it by hand or other power or held fast immovable, forming only a rotatable wave-motor, as desired. The dynamo P is also provided with a clutch-lever $m'$, whereby it may be started or stopped at will, Figs. 1 and 3. A similar clutch-lever device may be applied to the crank-arms of the wave-motors, and thereby turn on or off the power therefrom, as desired.

The solidity, durability, and indestructible storm-proof character of the piers A fit them especially for the erection of superstructure buildings, factories, hotels, seaside resorts, pavilions, and sea promenades erected upon or raised above the piers and reached from the shore by abutments, walls, or footbridges $n'$, Fig. 3, upon piles $o'$, driven down into the ocean bed or bottom, upon the top of which electric wires $p'$ are strung to conduct the electric currents from the piers to any desired place on shore or land for use as electric power, light, heat, and general purposes. These bridges $n'$ may be formed as walls or end dams to prevent any endwise currents of water. The platform of the pavilion or sea promenade $r'$ may be provided with hand-railing $u'$ and covered by a roof $s$ and electric lights $t'$ and stairways $q'$, forming a valuable and desirable seaside resort for pier fishing, promenades, and other amusements in the summer seasons.

In order to prevent the surf or waves from dashing up out of the boxes U onto the top of the piers, a close-fitting dashboard or fender $v'$ is provided in front of each box, and the sides and front of said boxes U are cut on a curve to allow of the free rise and fall of said boxes in as close touch with said fenders $v'$ as may be desired when said boxes are used as combined lever and rotary wave-motors; but such will not be necessary when said boxes are held fast, immovable, and adapted to form rotary wave-motors alone.

Operation: In the operation of my invention as a combined lever and rotary wave-motor the least wave ripple or disturbance of the water causes a rise and fall of the buoyant pendent front end of the boxes U, thereby acting as a huge pump-handle lever, working the crank-arms $e'$ backward and forward or up and down, and thereby working one set of the pumps L, while the other set of pumps L is worked by the rotation of the other crank-arms $d'$, caused by the rotation of the series of endless chains of troughs within the said boxes U, the said troughs being caused to travel upward by the inflowing tide, the rise, fall, weight, and push of the incoming waves, the said troughs being further additionally caused to travel downward by the speed, weight, and pressure of the outflow water or ebb, which is, like the incoming tide-water, converged and concentrated against the troughs by means of the passage-ways or channels between the piers converging from a wide entrance for the water at the points or ends of the piers down to a narrow passage-way or channel through the boxes U, over and under the endless chain of troughs, thereby obtaining a continuous rotation of said troughs in one common direction. The resultant commotion and disturbance of the water caused by the contending forces of the incoming and outgoing water acting upon the endless chain of troughs also imparts a rapid up-and-down lever motion to the boxes U, and thus the pumps L connected to said boxes U are actuated by said motion of said boxes, and the pumps L connected to the endless chain of troughs are actuated by said rotation of said troughs and pump water from the reservoirs M into the hydraulic compressor N, which, being forced therefrom into the water-engine O, drives it at a continuous and controlled speed, where, by a belt or other connection, the dynamos P are rotated at any desired speed, thereby generating electric currents, which are conducted by wires $p'$ to the shore or land to a desired place or places for use as electric power, light, heat, and other purposes.

The inclined endless chain of troughs or propeller devices form a traveling partition or sea-wall, and it will be obvious that the arrangement of this inclined sea-wall of troughs or propeller devices forms a mechanical sea-shore upon which the incoming tidal waves must beat and fall as they formerly did upon the natural sea-shore, as this mechanical sea-shore takes its place. It will also be understood that additional power may be also obtained from the rising and falling weight of the said boxes U, if made buoyant or pendent from the piers A, the disturbance, great or small, of the water causing a corresponding motion of said boxes U.

It will be obvious that a continuous rotary power alone can be produced by simply securing the boxes U fast to the piers and dispensing with the pendulum or lever motion thereof. It will also be obvious that the supports or piers may be constructed, as illustrated in Figs. 1 and 11, solely of the piles and timbers, thereby forming the pen, provided with a power house or room formed within or on the pier, without the use of any filling-in material where greater economy of construction is desired. It will also be necessary to connect the piers to the shore by means of one or more bridges $n'$, upon which pedestrians may pass and machinery and other material be hauled, and also serve as a support for the wires $p'$ for conducting the electric currents to the shore and transmitting electric light, heat, and power to the desired place.

I do not limit myself to the exact construction illustrated and described, as such may be varied in minor details and be within the province of my invention—as, for instance, channels or passage-ways may be excavated in the shore itself and the piers A dispensed with and the boxes U, provided with the rotary wave-motors, be arranged and concreted in said channels or passage-ways to be actuated by the tides and waves flowing into and out of said channels.

It will be further understood that the boxes U are provided with an inclined curved top adapted to force the incoming water over and around the top of the trough-chain, and an inclined bottom adapted to converge and concentrate the outgoing water against and around the bottom of the said trough-chain, as illustrated in Fig. 3.

It will be understood that the frame culvert or chute-boxes U are formed within an inclined central partition or wall, which form two separate passages, one above for the incoming tide and waves and the other below for the outgoing tide or ebb and waves which are concentrated and converged upon and under said central partition, platform, or wall, the said platform or wall being provided with an endless chain of troughs or propeller devices surrounding said platform or wall and traveled thereupon by the waves and tides.

Having described my invention, what I claim is—

1. A rotatable wave-motor comprising an endless chain of troughs or propellers, provided with supports, said supports being arranged and adapted to converge and concentrate the waves and tides upon said motor, thereby rotating said motor.

2. A rotatable wave-motor comprising an endless propeller-chain provided with supports, said supports being arranged and adapted to converge and concentrate both the incoming tide-water and the outgoing tide or ebb water, upon said motor, thereby rotating said motor.

3. A rotatable wave-motor comprising an endless chain of troughs or propellers inclined upward from the ocean, and provided with means or supports arranged and adapted to converge and concentrate the waves and tides upon said motor, thereby rotating said motor.

4. A rotatable wave-motor comprising an endless propeller-chain inclined upward from the ocean, and provided with means or supports arranged and adapted to converge and concentrate the incoming tide-water or the outgoing tide or ebb water, upon said motor, thereby rotating said motor.

5. A combined lever wave-motor, and rotary wave-motor; means for converging and concentrating the waves and tides upon said motors and obtaining thereby a motion and power from each of said motors.

6. A combined lever wave-motor and rotary wave-motor; means for converging and concentrating both the incoming tide-water, and the outgoing tide or ebb water, upon said motors, thereby obtaining a motion and power from each of said motors.

7. A rotatable wave-motor comprising an endless propeller-chain arranged in a culvert, box or chute, and adapted to be rotated by the waves and tides.

8. A rotatable wave-motor comprising an endless chain of troughs or propellers arranged in a culvert, box or chute, and adapted to be rotated by the incoming tide-water, or the outgoing tide or ebb water.

9. A rotatable wave-motor comprising an endless propeller-chain arranged in a culvert, box or chute; means for converging and concentrating the waves and tides upon said chain and thereby rotating said motor.

10. A rotatable wave-motor comprising an endless inclined propeller-chain arranged in a culvert, box or chute; means for converging and concentrating both the incoming and outgoing tides and waves upon said troughs and thereby rotating said wave-motor.

11. A combined lever wave-motor and rotary wave-motor, comprising culvert, box or chute; and an endless propeller-chain arranged to rotate within said culvert, box or chute; means for obtaining both a lever motion and a rotary motion therefrom when actuated by the tides and waves.

12. A combined buoyant lever wave-motor and a rotary wave-motor, comprising a buoyant endless chain of troughs or propeller devices; means for obtaining both a lever motion and a rotary motion therefrom when actuated by the waves and tides.

13. A box or chute provided with shafts or arms; guide rails or racks; guide grooves or rollers; a hoisting device; an endless chain of troughs or propeller devices arranged and adapted to form a rotatable wave-motor.

14. A box or chute provided with shafts or arms; guide rails or racks; guide grooves or rollers; a hoisting device; an endless chain of troughs; all arranged and adapted to form a combined lever and rotary wave-motor.

15. A box or chute, provided with a rotatable wave-motor, comprising an endless chain of troughs or propeller devices arranged and adapted to be actuated by the waves and tides.

16. A lever box or culvert wave-motor, provided with a rotatable wave-motor, comprising an endless chain of troughs or propeller devices actuated by the waves and tides, as a combined lever and rotary wave-motor.

17. A culvert box, chute, or frame provided with a rotatable endless chain of troughs, propeller arms or blades, and means for causing the inflow or outflow tide-water to pass over or under said troughs or propeller devices, thereby actuating the same.

18. A culvert, box, chute or frame provided with a rotatable propeller device, and means for causing the inflow or outflow water to pass over or under said propeller device, thereby rotating it.

19. A culvert, box or chute, provided with a partition or wall, forming separate passage-ways or channels, for the separate passage of the inflow and outflow tides and waves, said box or chute being arranged and adapted to form a lever wave-motor.

20. A culvert, box or chute, provided with a support, partition or wall; separate passage-ways or channels; for the separate passage of the inflow and outflow tides and waves; rotatable propeller devices in said passage-ways; arranged and adapted to be actuated by the incoming and outgoing waves and tides.

21. A culvert, box or chute, provided with rotatable propeller devices arranged in separate passage-ways or channels, for the separate passage of the inflow and outflow tides and waves; said propeller devices being actuated by the said waves and tides.

22. A culvert, box or chute, provided with rotatable endless-chain propeller devices, arranged in separate passage-ways or channels, for the separate passage of the inflow and outflow tides and waves, said propeller devices being actuated by the incoming and outgoing waves and tides.

23. A lever culvert, box or chute, provided with rotatable propeller devices, arranged in separate passage-ways or channels, for the separate passage of the inflow and outflow waves and tides; said box or chute and said propeller devices being actuated by the incoming and outgoing waves and tides, forming thereby a combined lever and rotary wave-motor.

24. A lever culvert, box or chute, provided with rotatable chain propeller devices, arranged in separate passage-ways or channels, one above the other, for the separate passage of the inflow and outflow waves and tides; said lever box or chute and said propeller devices being actuated by the incoming and outgoing waves and tides, forming thereby a combined lever and rotary wave-motor.

25. A series of piers or supports for wave-motors; converging passage-ways arranged between said piers or supports, for the passage of the waves and tides; a power mechanism arranged within or upon said piers; a series of combined lever wave-motors, and rotatable wave-motors arranged between said piers, and connected to said power mechanism; said wave-motors being actuated by the waves and tides, and thereby actuating said power mechanism.

26. A series of piers or supports for wave-motors; converging conduits or passage-ways for the passage of the waves and tides; a power mechanism; a series of combined lever wave-motors and rotary wave-motors, arranged between and connected to said piers, and to said power mechanism; said wave-motors being actuated by the waves and tides, and thereby actuating said power mechanism.

27. A series of piers or supports for wave-motors; converging conduits or passage-ways for the passage of the waves and tides; a power mechanism; a series of combined buoyant floating lever wave-motors, and rotary wave-motors, arranged between and connected to said piers, and to said power mechanism; said combined wave-motors being actuated by the waves and tides, and thereby actuating said power mechanism.

28. A combined buoyant pendulum-lever wave-motor and a rotary wave-motor, means for obtaining both a lever motion and a rotary motion therefrom, when actuated by the waves and tides.

29. A box, frame or chute pivoted to a support and provided with a propeller or motor device, arranged and adapted to be actuated by the waves and tides, means for raising and lowering said box or chute.

30. A box, frame or chutes pivoted to a support and provided with a propeller or motor device arranged and adapted to be actuated by the waves and tides passing over, through or under said frame, box or chute.

31. A lever, box, frame or chute, arranged and adapted to converge the waves and tides; a rotary mechanism secured to said lever box, or chute, arranged and adapted to be actuated by the waves and tides.

32. A frame, box or chute provided with an endless chain or a propeller device, all arranged and adapted to form a combined buoyant, floating lever wave-motor and rotary wave-motor.

33. A frame, box or chute, provided with an endless chain or a series of floats arranged and adapted to form a combined buoyant lever and a rotary wave-motor.

34. A lever box, frame or chute provided with a propeller device; means for causing the waves and tides to pass through, over or under said frame, box or chute, and thereby actuate said propeller devices.

35. A box, frame or chute provided with an endless chain of troughs or propeller devices; means for causing the waves and tides to pass through, over or under said frame, box or chute in contact with said propeller devices and thereby actuate said propeller devices and chain.

36. A box, frame or chute arranged and adapted to form an upper and lower passage-way for the waves and tides; an endless chain of troughs or propeller devices arranged and adapted to form an inclined treadmill or overshot and undershot endless-chain wave-motors, actuated by the waves and tides.

37. A support or supports for a wave-motor; said support or supports being arranged and adapted to form a dam or breakwater, provided with passage-ways; an endless chain or chains of propeller devices arranged in said passage-ways to form inclined treadmills, or overshot and undershot endless-chain wave-motors actuated by the waves and tides.

38. A support or supports for a wave-motor; said support or supports being arranged and adapted to form a dam or breakwater, provided with converging passage-ways; and endless chain or chains of propeller devices arranged in said passage-ways to form inclined treadmills, or overshot and undershot endless-chain wave-motors, actuated by the waves and tides.

39. A wave-motor arranged and adapted to be actuated by the waves and tides as an inclined treadmill or an overshot and undershot wave-motor.

40. A wave-motor comprising propeller devices arranged and adapted to be overshot and undershot by the waves and tides.

41. A buoyant wave-motor comprising propeller devices arranged and adapted to be overshot and undershot by the waves and tides.

42. A buoyant wave-motor comprising propeller devices arranged and adapted to form an inclined treadmill or an overshot and undershot wave-motor actuated by the waves and tides.

In testimony whereof I affix my signature hereunto in the presence of two witnesses.

GEORGE NOBLÉ-TODD.

Witnesses:
JAMES P. CLARK,
SUSIE M. GRAY.